US009547865B2

(12) United States Patent
Torigoe et al.

(10) Patent No.: US 9,547,865 B2
(45) Date of Patent: Jan. 17, 2017

(54) SYSTEM AND METHOD FOR PROVIDING ADVERTISING SERVER OPTIMIZATION FOR ONLINE COMPUTER USERS

(75) Inventors: Kendra Torigoe, San Jose, CA (US); Vinay Desai, Santa Clara, CA (US); Santanu Dey, Santa Clara, CA (US)

(73) Assignee: eBay Inc., San Jose, CA (US)

(*) Notice: Subject to any disclaimer, the term of this patent is extended or adjusted under 35 U.S.C. 154(b) by 90 days.

(21) Appl. No.: 12/645,018

(22) Filed: Dec. 22, 2009

(65) Prior Publication Data
US 2010/0250361 A1    Sep. 30, 2010

(51) Int. Cl.
*G06Q 30/02*    (2012.01)
(52) U.S. Cl.
CPC .......... *G06Q 30/02* (2013.01); *G06Q 30/0243* (2013.01)
(58) Field of Classification Search
CPC .................................................. G06Q 30/00
See application file for complete search history.

(56) References Cited

U.S. PATENT DOCUMENTS

| 7,827,060 | B2* | 11/2010 | Wright | G06Q 30/02 |
| | | | | 705/14.4 |
| 2005/0256766 | A1* | 11/2005 | Garcia et al. | 705/14 |
| 2006/0248035 | A1* | 11/2006 | Gendler et al. | 707/1 |
| 2008/0082655 | A1* | 4/2008 | Goswami | 709/224 |
| 2008/0288348 | A1* | 11/2008 | Zeng et al. | 705/14 |
| 2009/0043593 | A1* | 2/2009 | Herbrich et al. | 705/1 |
| 2010/0030647 | A1* | 2/2010 | Shahshahani | 705/14.66 |
| 2010/0082421 | A1* | 4/2010 | Tuladhar et al. | 705/14.41 |

OTHER PUBLICATIONS

Richardson et al., "Predicting Clicks: Estimating the Click-Through Rate for New Ads," International World Wide Web Conference Committee, pp. 522-529, May 8-12, 2007, Banff, Alberta, Canada. (Available on the internet).*

* cited by examiner

*Primary Examiner* — Eric Netzloff
(74) *Attorney, Agent, or Firm* — Schwegman, Lundberg & Woessner, P.A.

(57) ABSTRACT

A system and method for providing advertising server optimization for online computer users is disclosed. A particular embodiment includes obtaining an advertisement; defining a set of features of the advertisement; generating a predicted click through rate (CTR) corresponding to the advertisement based in part on the set of features; ranking the advertisement based on the generated click through rate; and serving the advertisement based on the ranking.

23 Claims, 9 Drawing Sheets

SYSTEM AND METHOD FOR PROVIDING ADVERTISING SERVER OPTIMIZATION FOR ONLINE COMPUTER USERS

RELATED APPLICATION

This application claims the priority benefits of U.S. Provisional Application No. 61/164,849; filed Mar. 30, 2009, which is incorporated in its entirety herein by reference.

TECHNICAL FIELD

This application relates to a method and system for use with an electronic commerce system, according to one embodiment, and more specifically, for providing advertising server optimization for online computer users.

BACKGROUND

Conventional advertising (ad) servers distribute a large number of ads for display on a variety of host sites. Typically, a particular ad is matched to a user at the host site based on a search performed or a purchase made by the user. Keywords entered by the user or related to the search or purchase can be used to find related ads for display to the user. However, it is not clear in conventional systems how effective these ads really are in promoting action by the user in response to the ad. Further, these systems typically serve large number of ads to large numbers of users. As such, network resources can be strained and unable to accommodate additional users.

Thus, a system and method for providing advertising server optimization for online computer users is needed.

BRIEF DESCRIPTION OF THE DRAWINGS

The various embodiments is illustrated by way of example, and not by way of limitation, in the figures of the accompanying drawings in which.

DETAILED DESCRIPTION

In the following description, for purposes of explanation, numerous specific details are set forth in order to provide a thorough understanding of the various embodiments. It can be evident, however, to one of ordinary skill in the art that the various embodiments may be practiced without these specific details.

In one embodiment, a system and method for providing advertising server optimization for online computer users is disclosed. In various example embodiments, an Ad Optimizer is coupled to an Ad Server. The Ad Optimizer provides a ranking of displayable ads based on the number of bids on an ad and the ad's click through rate (CTR). The Ad Optimizer can also monitor an advertiser's budget relative to the advertiser's ad costs.

Features for each ad are defined and used in the ranking calculation. A feature is a calculated value (generally 0 or 1) that can be factored into a model to determine the predicted CTR (pCTR) for an ad unit. An ad unit is an instance of an ad. An optimization model is provided as a linear formula that applies coefficients to feature values to determine the predicted CTR for an ad unit. During real-time, ad requests can be made to the Ad Server and ads can be ranked by the Ad Optimizer and served according to the ranking.

A particular embodiment can use an application programming interface (API) Web application that can make use of host site search and other API's to provide search results to users in a simpler format. Search results and can be customized according to user profile information associated with one or more particular consumers and information related to particular products, listings, or advertisements. The user profile information can be generated and processed based on user/consumer responses to queries prompted by the system.

In a particular example embodiment, a central ad repository (denoted an ad server) can gather and store advertisement (ad) postings (e.g., listings) from various sites. The gathered ads can be processed for posting to a pre-configured set of destination sites that may be other local sites, regional sites, or global sites. Then the processed ads are pushed to the destination sites.

Figure 1:
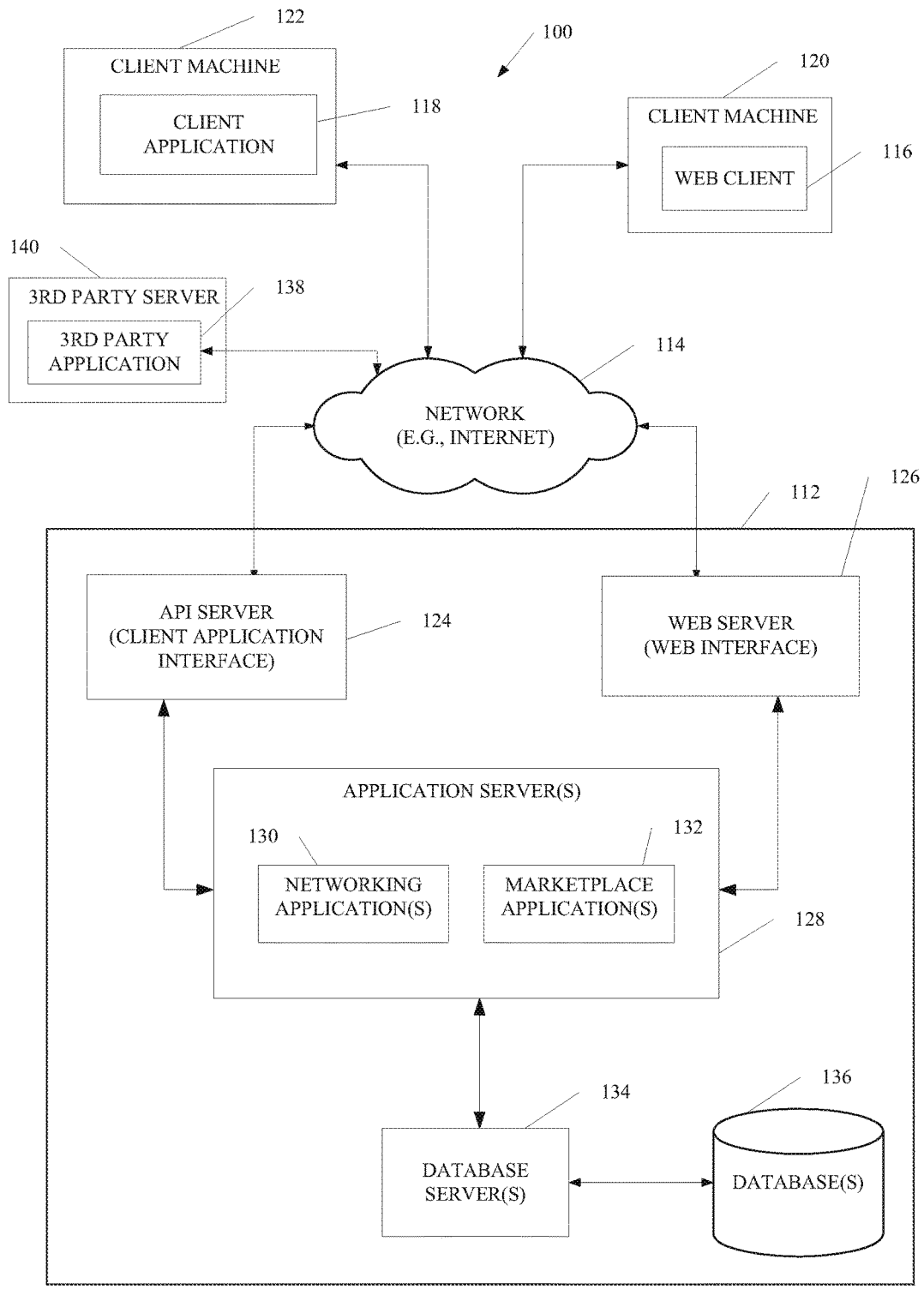
FIG. 1 is a network diagram depicting a network system, according to one embodiment, having a client-server architecture configured for exchanging data over a network.

FIG. 1 is a network diagram depicting a network system 100, according to one embodiment, having a client-server architecture configured for exchanging data over a network. For example, the network system 100 may be a trading/commerce system where clients may communicate and exchange data with the trading/commerce system, the data may pertain to various functions (e.g., online purchases) and aspects (e.g., managing social networks) associated with the network system 100. Although illustrated herein as a client-server architecture for simplicity, in other embodiments the network architecture may vary and include an architecture such as a peer machine in a peer-to-peer (or distributed) network environment.

Returning to FIG. 1, a data exchange platform, in an example form of a network-based provider (or host system/site) 112, provides server-side functionality, via a network 114 (e.g., the Internet) to one or more clients. The one or more clients may include users that may utilize the network system 100 and more specifically, the network-based provider 112, to exchange data over the network 114. These transactions may include transmitting, receiving (communicating) and processing data to and from the multitude of users. The data may include, but is not limited to, user preference information, user profile information, listing search queries, shopping or listing context information and/or identifiers, context data, notations (e.g., personal and public shopping notes), context filter data, shared electronic shopping carts, product and service reviews, product, service, manufacture, and vendor recommendations and identifiers, product and service listings associated with buyers and sellers, auction bids, feedback, etc. In one embodiment, the user profile information can be associated with one or more contexts generated by a user or other users and maintained on the network-based provider 112. Data associated with a user profile, such as any of the data described above, may be publicly shared as determined by the originator of the data.

Turning specifically to the network-based marketplace 112, an application program interface (API) server 124 and a web server 126 are coupled to, and provide programmatic and web interfaces respectively to, one or more application servers 128. The application servers 128 host one or more networking application(s) 130 and marketplace application(s) 132. The application servers 128 are, in turn, shown to be coupled to one or more databases servers 134 that facilitate access to one or more databases 136.

In one embodiment, the web server 126 may send and receive data pertaining to a user profile or item listing via a toolbar installed on a browser application. The toolbar may allow for a user or a third party to, inter alia, create a new user profile (a profile creator), selectively add a uniform resource locator (URL) associated with the created user profile, and create notations regarding research and general matters associated with the user profile. In other embodiments, the web server may serve a page or the API server 124 in conjunction with the client application 118 may provide the same or similar functionality as that described with reference to the toolbar. It may be noted that using a toolbar within an application such as a browser or stand alone application is well known in the art.

The marketplace application(s) 132 may provide a number of marketplace functions and services (e.g., item listings, searching, advertisement, payment, etc.) to users that access the network-based marketplace 112. The networking application(s) 130 likewise may provide a number of consumer services, merchant services, or social networking services and functions to users. The networking application(s) 130 may allow a user to generate one or more contexts related to shopping or advertisement (ad) generation, which may include listings (e.g., for products and services) couched as a broad category associated with a consumer, a class of consumers, and/or an item (e.g., a product or service or a listing for a product or service) or class of items. Additionally, listings can be couched as associated with a specific consumer or a specific item. For example, listings in the form of a category could be, "digital cameras" or "plumbers." Similarly, a context can include a user profile associated with a category of users or a specific user. For example, a user profile in the form of a category could be, "women over 40 years old" or "purchasers of digital cameras." An example of a user profile in a more specific form may be, "a user profile for John A. Smith of Akron, Ohio" or "purchasers of Canon digital cameras." The level of specificity may vary and is selectable by the user profile creator or administrator of the advertising optimization engine of a particular embodiment. For example, the user profile can be as specific as a particular person or the associated listing associated with a make, model, additional specific attributes or features of a specific item or service offered for sale or lease.

In one embodiment, the networking application(s) 130 and marketplace application(s) 132 may provide a client (e.g., web client 116) with an interface that includes input fields for personality or item/listing attributes most commonly selected by other users as the most important or most determinative attributes related to the products/services which a user/consumer is seeking or selling. For example, a multitude of users may have indicated they thought the most important personality attributes for the user profile include information related to: 1) consumer/user need, 2) general consumer/user personality, 3) consumer/user shopping attitude, and 4) consumer/user budget. A multitude of other users may have indicated they thought the most important item attributes for a digital camera purchaser user profile include: 1) digital camera brand, 2) pixel count, 3) zoom, and 4) size. These user profile attributes may be independently developed or discovered by the network-based marketplace 112 by processing the attribute data received from the multitude of users or may be based on the user profile creator ranking the attributes or a combination thereof.

The networking application(s) 130 may allow the user profile creator or advertising optimization engine user to distribute the one or more user profiles to one or more groups defined by the user profile creator or advertising optimization engine user (e.g., "my family," "my friends," etc.) or to groups at various levels in a predefined category (e.g., "photography group," "digital camera group," or "Canon digital camera group," etc.).

While the networking application(s) 130 and the marketplace application(s) 132 are shown in FIG. 1 to form part of the network-based marketplace 112, it can be appreciated that, in alternative embodiments, the networking application(s) 130 may form part of a social networking service that is separate and distinct from the network-based marketplace 112.

FIG. 1 also illustrates a third party application 138, executing on a third party server machine 140, as having programmatic access to the network-based marketplace 112 via the programmatic interface provided by the API server 124. For example, the third party application 138 may, utilizing information retrieved from the network-based marketplace 112, support one or more features or functions on a website hosted by the third party. The third party website may, for example, provide one or more networking, marketplace or payment functions that are supported by the relevant applications of the network-based marketplace 112.

Figure 2:
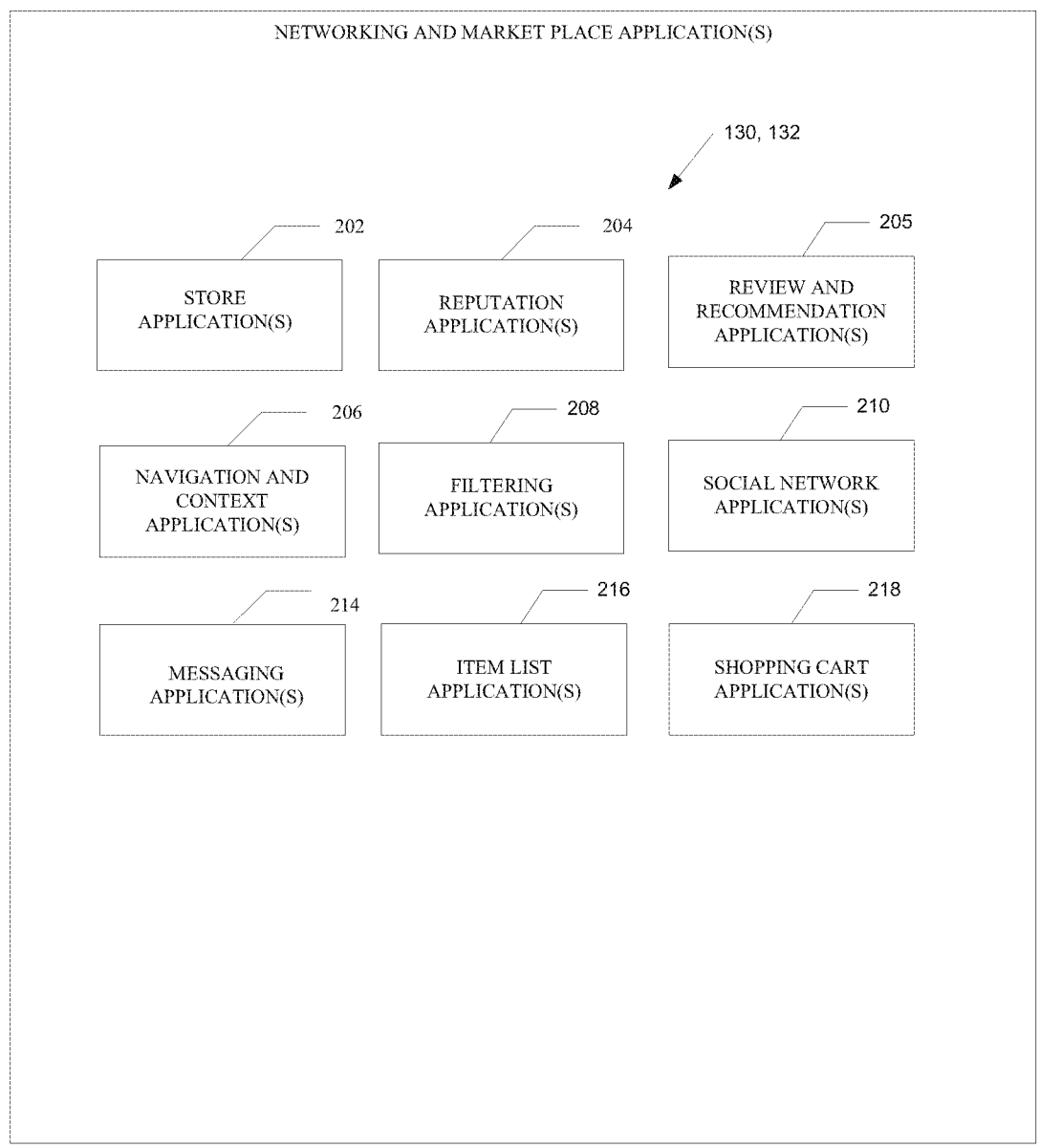
FIG. 2 is a block diagram illustrating an example embodiment of multiple network and marketplace applications, respectively, which are provided as part of a network-based marketplace.

FIG. 2 is a block diagram illustrating an example embodiment of multiple network and marketplace application(s) 130 and 132, respectively, which are provided as part of the network-based marketplace 112. The network-based marketplace 112 may provide a number of listings for goods and/or services, category-based shopping, social networking, and purchase and bidding systems, various levels of features provided for users, and price-setting mechanisms whereby a seller may list goods and/or services (e.g., for sale, bid, or lease) and a buyer may buy or bid on listed goods and/or services. A user profile and context associated with a user shopping or listing an item in the network-based marketplace 112 may offer or provide information that may be helpful in assisting the advertising optimization engine user in customizing their shopping or listing experience pertaining to the user profile or listing information (i.e., context). Among various embodiments, the recommendations, reviews, or research notes corresponding to the user profile or listing information may be directed from another user to one or more users desiring data associated with the user profile or listing information or the data may be provided from storage by the network and marketplace application(s) 130 and 132 based on the user profile or listing information provided by a user. The data may be provided based on a request from the user profile creator or automatically pushed to the user profile creator based on policy or a user configuration file.

To this end, the network and marketplace application(s) 130 and 132, respectively, are shown to include one or more application(s) which support the network-based marketplace 112, and more specifically the generation and maintenance of one or more user profiles provided by users of the network-based marketplace 112 or advertising optimization engine users. These applications can include support for activities associated with the user profiles and listing information, including storing and retrieving user notes, web sites (URLs), links associated with related tags, research and notes from other users and community members, related community groups, vendors, providing localized geographic data for user profiles (e.g., regional consumer purchasing patterns), etc. Additionally, the various applications may support social networking functions, including building and maintaining the community groups created by a user, which may be helpful in providing various types of data (e.g., reviews, notes, local services, consumer information, etc.) pertaining to the user profiles and listing information.

Store application(s) 202 may allow sellers to group their listings (e.g., goods and/or services) within a "virtual" store, which may be branded and otherwise personalized by and for the sellers. Such a virtual store may also offer promotions, incentives and features that are specific and personalized to a relevant seller and consumer. In one embodiment, based on the user profiles provided by the user profile creator, the virtual store may be provided to the user profile creator or advertising optimization engine user where the virtual store may carry or sell an item or service related to a user's need based on the user profile.

Reputation application(s) 204 may allow parties that transact utilizing the network-based marketplace 112 to establish, build, and maintain reputations, which may be made available and published to potential trading partners. Consider that where, for example, the network-based marketplace 112 supports person-to-person trading, users may have no history or other reference information whereby the trustworthiness and/or credibility of potential trading partners may be assessed. The reputation application(s) 204 may allow a user, for example through feedback provided by other transaction partners, to establish a reputation within the network-based marketplace 112 over time. Other potential trading partners may then reference such a reputation for the purposes of assessing credibility, trustworthiness, or the like. A user creating a user profile and seeking reviews, research (e.g., notes, etc.), and recommendations associated with the profile may filter the result data from the search or context submission based on reputation data. For example, the user profile creator may only want profile data such as reviews and research notes pertaining to the user profile from other users with a greater than 3 out of 5 star reputation rating.

In one embodiment, the network-based marketplace 112 includes review and recommendation application(s) 205. The social networking application(s) 210 may work in conjunction with the review and recommendation application(s) 205 to provide a user interface to facilitate the entry of reviews of the user profile data received from other users. A review may be a text entry of the community group member's opinion, a standard review form including check boxes indicating a level satisfaction, or a combination of both, etc. Recommendations may include a specific type of demographic, item, a specific brand or service for a type of item, a specific retailer for the item, etc.

Navigation of the network-based marketplace 112 may be facilitated by one or more navigation and context application(s) 206. For example, a context application may, inter alia, enable key word searches of item listings associated with a context defined by a user profile of a particular consumer. The context can include an association between the user profile data in the user profile and item feature sets related to items in the item listings. The item listings can include listings from a group including products or services or both. The item feature set data and data defining the association between the user profile data in the user profile and item feature sets may be retrieved from the network-based marketplace 112 (e.g., databases 136) or from various other remote sources, such as other network sites, other users (e.g., experts or peers), etc. In one embodiment, a toolbar installed on a browser application may be used for functions including interactive and navigation functions to create a new user profile, selectively add a uniform resource locator (URL) associated with the created user profile, and create notations regarding research and general matters associated with the user profile. These functions may be user accessible by many methods known in the art, including a web form interface (HTML or embedded Java) or a stand alone application interface. For example, a navigation application may include a browser that allows users via an associated user interface to browse a user's user profile, various item listings, item feature sets, contexts, catalogues, inventories, social networks, and review data structures within the network-based marketplace 112. In one embodiment, the user interface includes selectable elements in the form of tabs to separate out various categories of user profile data that when selected generate a list associated with the category. For example, a tab for "My Notes," a tab for "Everyone's Notes," a tab for "Buy," and a tab for "Sell". Various other navigation applications (e.g., an external search engine) may be provided to supplement the search and browsing applications.

In one embodiment, using filtering application(s) 208, the user or advertising optimization engine user may customize result data associated with a user profile or listing search results. The filtering application(s) 208 may generate the result data according to one or more rules provided by the network-based marketplace 112 and the user receiving the filtered result data. For example, as discussed above with reference to the reputation application(s) 204, the user may only want the user profile to match on item listings pertaining to item reviews from other users with a greater than 3 out of 5 star reputation rating. In another example, the user may only want user profile data to match on item listings pertaining to item listings with a particular feature set or attribute set. For example, the user may only want result data for digital cameras with equal or greater than 5 megapixels. Additionally, the filtering rules may be combinable or modifiable to broaden or narrow the scope of the result data. The filtering application(s) 208 may also be used to implement rules for granting or allowing access to the user profile data.

Messaging application(s) 214 may be used for the generation and delivery of messages to users of the network-based marketplace 112. For example, the user may like a particular review or research from another user and may wish to contact the user for additional information. In one embodiment, the messaging application(s) 214 may be used in conjunction with the social networking application(s) 210 to provide promotional and/or marketing (e.g., targeted advertisements associated with the user profile) to the user or a related user from vendors and community members that may have offerings related to the user profile.

Item list application(s) 216 may be used in the network-based marketplace 112 by the user to create an item list based on selecting one or more items and services to purchase (or sell, auction, lease, or donate), which may be at least partially based on result data associated with the user's shopping experience. The item list application(s) 216 may be accessed via a user interface that allows the user to create and use the item list. Additionally, the user may selectively share this list within a community or to all users to gain or solicit additional data such as vendor recommendations for each purchase or vendor reviews for vendors that may be present in the list.

In one embodiment, electronic shopping cart application(s) 218 are used to create a shared electronic shopping cart used by a user to add and store items from a shopping list generated by the user (e.g., by making selections from a "Buy" tab). The electronic shopping cart application(s) 218 may facilitate the transactions for each item on the list by automatically finding the items in the electronic shopping cart across at least one or all of a set of vendors, a comparison shopping site, an auction site, other user's ads, etc. In one embodiment, a multitude of transactions may appear as one transaction based on the selection of "Bulk Purchase." In various embodiments, the selection criteria for which vendor or vendors to purchase from may include, but is not limited to, criteria such as lowest cost, fastest shipping time, preferred or highest rated vendors or sellers, or any combination thereof.

It can be appreciated that one or more of the various example networking and marketplace application(s) 130, 132 may be combined into a single application including one or more modules. Further, in some embodiments, one or more applications may be omitted and additional applications may also be included.

Figure 3:
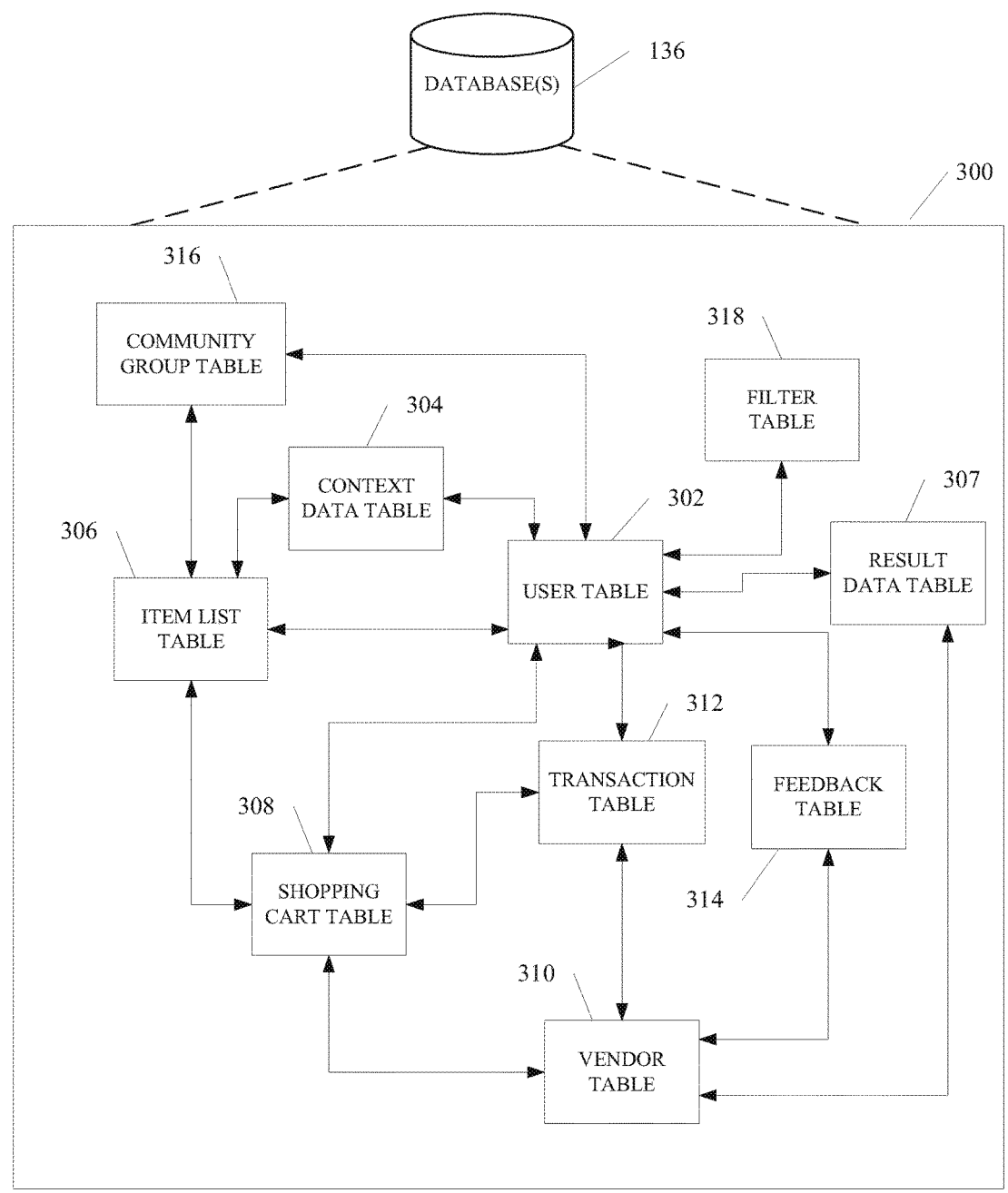
FIG. 3 is a high-level entity-relationship diagram, according to an example embodiment, illustrating various tables that may be maintained within a database to support networking and marketplace applications.

FIG. 3 is a high-level entity-relationship diagram, in accordance with an example embodiment, illustrating various tables 300 that may be maintained within the database(s) 136 (see FIG. 1), which may be utilized by and support the networking and marketplace application(s) 130 and 132, respectively. A user table 302 may contain a record for each registered user of the network-based marketplace 112, and may include identifier, address and financial instrument information pertaining to each such registered user. In one embodiment, a user operates as one or all of a user profile creator, a seller, a buyer, within the network-based marketplace 112.

The context data table 304 maintains a record of the one or more user profiles and/or listings created by or related to a user. As discussed above, this may include user profile identifiers and/or listing identifiers that may include words and/or phrases from the general to the specific for a consumer class, specific consumer, product/service class, or a specific product/service. Context data in context data table 304 can also include associations between the user profile data in the personalized consumer profiles and item feature sets related to items in the item listings. The item listings can be listings for products or services or both. The personalized consumer profiles, item feature set data, and data defining the association between the user profile data in the personalized consumer profiles and item feature set data may be stored into or retrieved from the context data table 304 of database(s) 136. In one embodiment, each word in a phrase may be a tag linked to another user profile and its associated data. For example "Canon" may be a selectable element within the user interface as a tag that results in the selector receiving more general data regarding Canon products. Similarly, "camera" may be selected to receive more general data regarding cameras, in this case both digital and film cameras.

The tables 300 may also include an item list table 306 which maintains listing or item records for goods and/or services that were created using the item list application(s) 216. In various embodiments, the item list may be created and shared with a community group or to all users in part to solicit feedback regarding listed or potential vendors.

Each listing or item record within the item list table 306 may furthermore be linked to one or more electronic shopping cart records within a electronic shopping cart table 308 and to one or more user records within the user table 302 and/or a vendor table 310, so as to associate a seller or vendor and one or more actual or potential buyers from the community group with each item record.

A transaction table 312 may contain a record for each transaction pertaining to items or listings for which records exist within the item list table 306. For example, the transaction table 312 may contain a purchase or sales transaction of an item of the item list by a consumer.

In one example embodiment, a feedback table 314 may be utilized by one or more of the reputation application(s) 204 to construct and maintain reputation information associated with users (e.g., members of the community group, sellers, etc.).

Group(s) of users found in a community group table 316 may be selected by a user to be members of a community group having access to user profile data and an item listing associated with the electronic shopping cart.

A filter table 318 may be used to sort and filter data associated with a user profile. The sorted or filtered data are then stored in the result data table 307 and linked to the user profile creator via a user profile identifier. Various types of filters and associated rules were discussed above with reference to the filtering application(s) 208 in FIG. 2.

Figure 4:
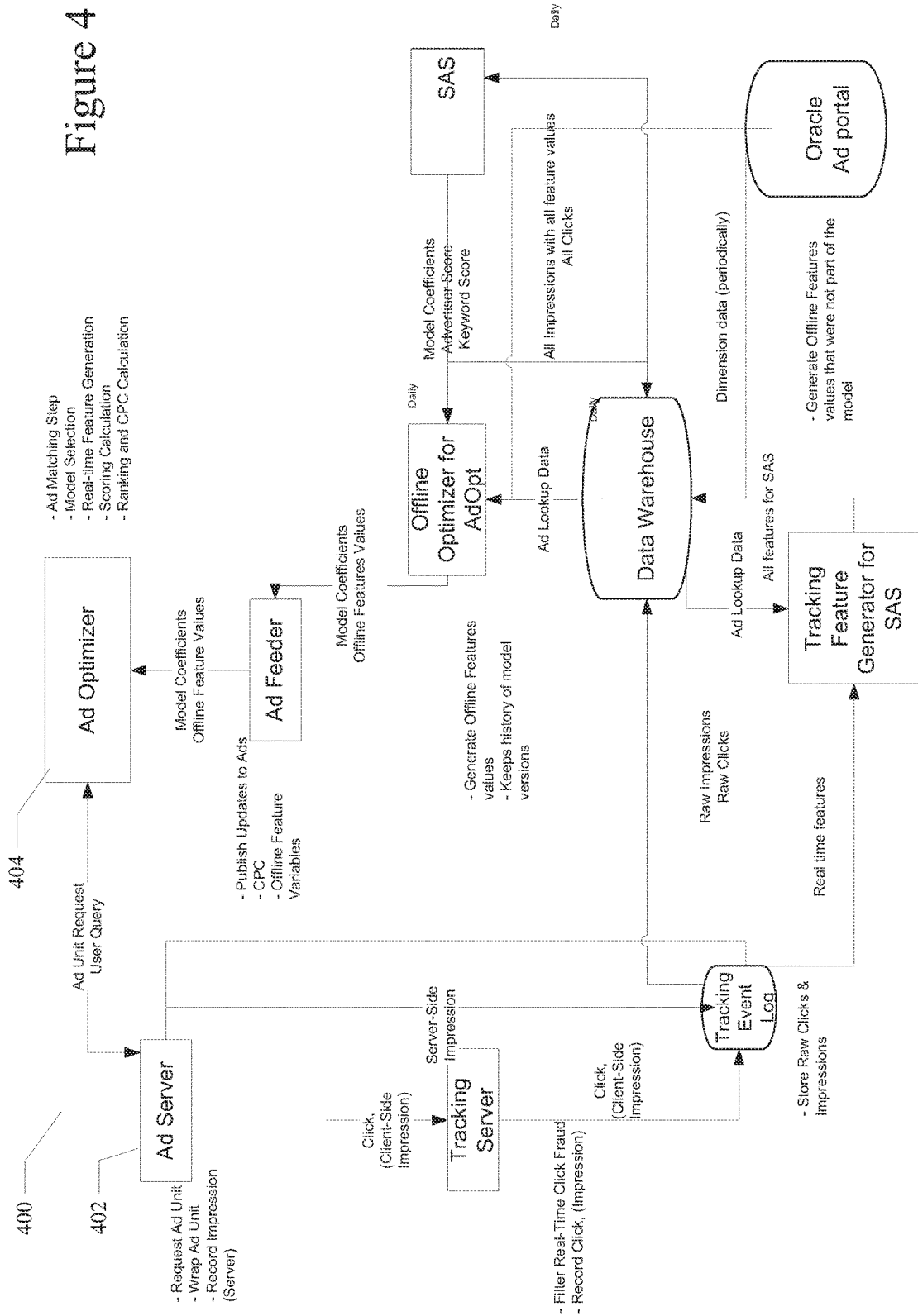
FIG. 4 is a system diagram illustrating an example embodiment of the system in which an advertising optimization server of a particular embodiment can operate.

FIG. 4 is a system diagram illustrating an example embodiment 400 of the system in which an advertising server 402 of a particular embodiment can operate in collaboration with an ad optimizer 404. As shown, the advertising server 402 can communicate via a network 726 with a plurality of ad system components, which can process and rank listings/ads for distribution to a plurality of destination sites.

In general, system 400 of an example embodiment, can rank a set of ads based on a highest expected revenue value for each ad. The expected revenue value for an ad is based on the cost per click (CPC) for the ad and the click through rate (CTR) for the ad. The advertisers who submit ads to the ad server 402 typically bid for an ad by specifying how much they are caning to pay for a user click of the ad (i.e., Max CPC). Thus, the advertisers provide the CPC value for the ad. The ad optimizer 404 optimizes the yield for each ad by computing the predicted CTR (pCTR) for the ad. The ad with the highest expected revenue value or predicted yield (pYield) is typically ranked to be shown in the first (best) position. In one embodiment, an Offline process can be used to calculate the pCTR for existing ad units, as the CTR for existing ads can be retrieved from historical data. In another embodiment, real-time ad scoring can be performed on new and existing ads. New ads can be assigned a default score as historical CTR data is not yet known.

Figure 5:
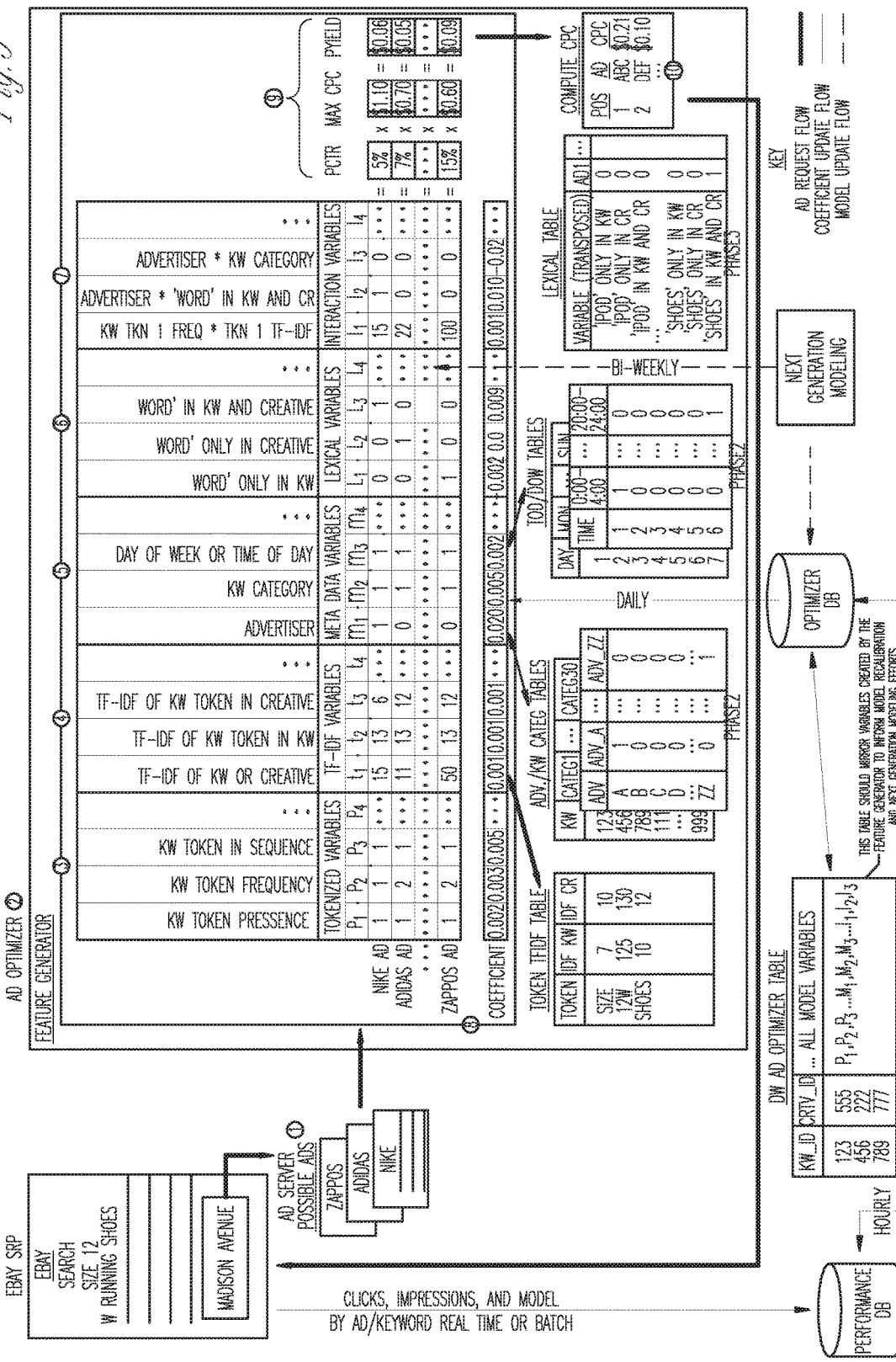
FIG. 5 is a block diagram illustrating an example embodiment of the components and processing flow of an advertising optimization engine of a particular embodiment.

FIG. 5 illustrates an example embodiment of the components and processing flow pertaining to the advertising optimization engine 404 of a particular embodiment.

Figure 6:
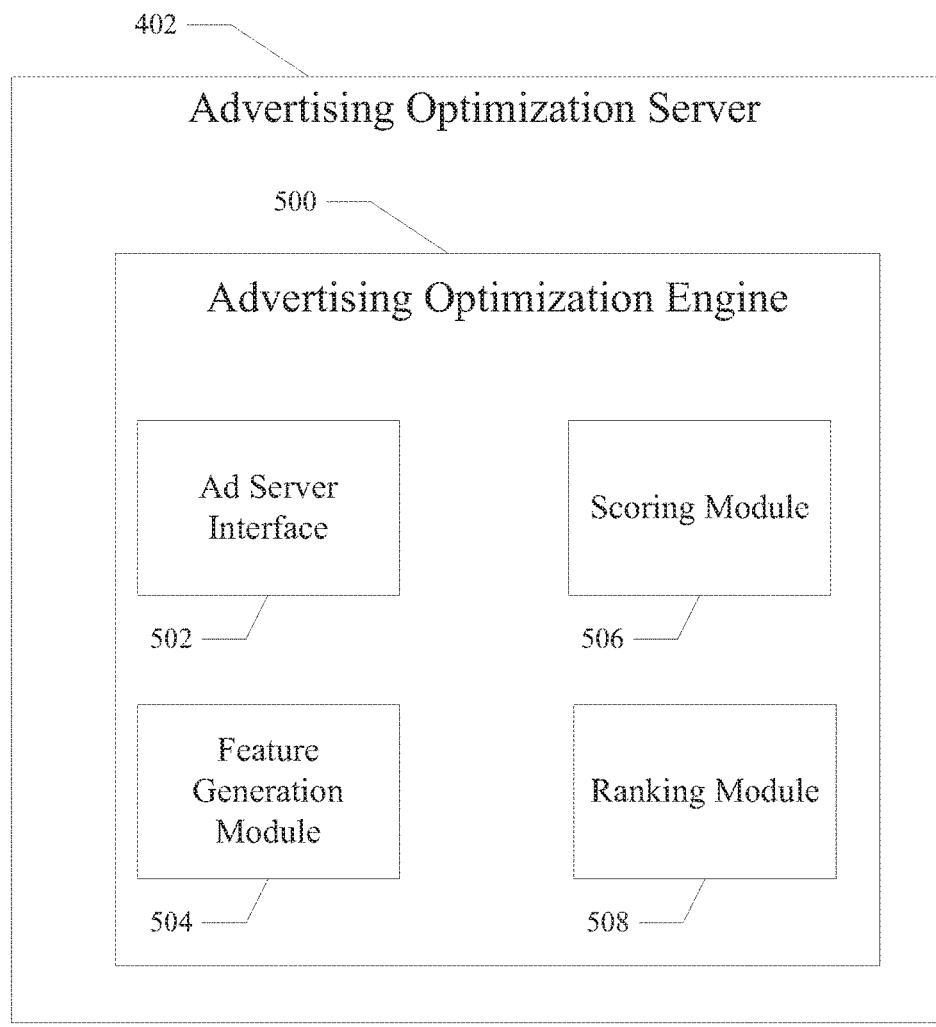
FIG. 6 is a block diagram illustrating an example embodiment of the components of an advertising optimization engine of a particular embodiment.

FIG. 6 illustrates an example embodiment of functional modules or tools pertaining to the advertising optimization engine 404 of a particular embodiment. It can be appreciated that the applications and associated modules may be executed within any portion of the network system 100, (e.g., the server machine 112). Additionally, the modules discussed herein are for example only and it can be appreciated these modules and applications may be combined into one or many modules and applications without departing from the spirit of the methods and systems described herein.

In the particular embodiment, the advertising optimization engine 404 may include a number of features, applications, services, tools, or modules, such as those described in more detail below.

Optimization Data

The optimization platform 400 can use multiple sources of data as inputs with some retrieved from offline sources (data warehouse, advertiser data, etc.) and some from real-time sources (Real-time module —RTM real-time context). In order to support this, an optimization data framework is provided to support multiple sources of data.

Variables

In a particular embodiment, a variable is a data element that can be plugged into a feature, which in turn can be plugged into an optimization model. The optimization data framework can be designed to support the following variable types.

| Variable Type | Description | Examples | Definition |
| --- | --- | --- | --- |
| Publisher real-time context variables | Data elements that are passed from RTM to the Ad Server during a real-time ad call. | Search query, category, time of day | Offline: N/A Real-time: Publisher and URL request parameter (i.e. "uq" for RTM user query). |
| Ad variables | Data elements that are part of the ad unit. | Creative Headline, Creative Line 1, Display URL, Image, Keyword | Offline: Defined as lookup in Oracle campaign tables. Real-time: Defined as lookup on Creative or Ad Unit tables. |
| Data warehouse variables | Data elements that are pulled from the DW. | CTR, bids, advertiser score | Offline: Lookup by ID in DW tables. This can require the creation of a set of normalized DW tables that can store calculated variable values at the appropriate level (advertiser, creative, ad unit). Can be defined by the DW table name and column name. Real-time: Defined as lookup on existing Advertiser, Creative or Ad Unit tables. |
| Oracle variables | Data elements that are pulled from the Oracle advertiser tables | Advertiser name, user targeting criteria | |

For each variable, we can define how often the value for the variable should be refreshed for each ad unit. The applicable values are as follows for a particular embodiment.

On creation (only once)
On modification
On interval (specify time interval)
Variables can be defined as one of the following:
Offline
Real-time Additionally, for each variable a default value can be assigned (optional). If the variable value for a particular ad unit is null or is not available, then the default value can be used. If no default value is assigned and the variable value is not available, then the variable value can be considered to be null.

Features

A feature is a calculated value (generally 0 or 1) that can be factored into a model to determine the predicted CTR (pCTR) for an ad unit. Features are expressed as a logical function of variable values and can require lookups to tables that can be available in the Ad Server 402. In one embodiment, there can be approximately 100 defined features but the framework can scale to support more than 100,000 features. In a particular embodiment, the following feature types can be supported:

| Feature Type | Description | Example (Description of function - actual features can be defined in code. Variables are displayed in brackets.) |
| --- | --- | --- |
| Tokenized Features | Tokenized features are used to measure the relationship between the user search query and the ad text. | Number of times the entire [search string] appears in the [headline of the creative] |
| TF-IDF Features | Term Frequency-Inverse Document Frequency is used to determine how important a token (word) is to an ad. Term Frequency refers to the number of times a token appears in an ad. Inverse Document Frequency refers to the total number of ads divided by the number of those ads that contain the token. Terms that occur frequently in a single ad and infrequently among all ads have higher scores. Common terms that appear frequently in ads and/or infrequently in an ad can score lower.<br>To support TF-IDF features, a token lookup table can be maintained in the Ad Server that contains the IDF score for each token. | Average TF-IDF score for all [search string] tokens across [creative text].<br>Note: In this case, [creative text] is actually 3 variables concatenated (headline + line 1 + line 2).<br>Also, IDF value is calculated by querying IDF lookup table. If no value exists for the token, a default value is used (as specified within a conditional clause). |
| Meta Features | Meta variables contain contextual data such as KW category, temporal or advertiser information. | [Advertiser] is Nike<br>[Keyword category] is Shoes<br>[Day of week] is Sunday<br>Note: "Day of week" is actually a function applied on top of the variable "current datetime" to strip of the day of week). |
| Lexical Features | Lexical features are custom rules involving specific tokens that have been shown to impact an ad's click-through rate. | "Free shipping" in [creative text]<br>Note: In this case, [creative text] is actually 3 variables concatenated (headline + line 1 + line 2). |
| Interaction Features | Interaction features are new features that are a combination of two or more of the previously generated features. | Feature123 × Feature456<br>Note: This could translate to "Advertiser is Nike AND category is shoes" |
| Lookup Features | These features can contain a function to do a lookup on a generic string lookup table using some string variable. The lookup function can return the numeric value associated with that string. The purpose of lookup features is to efficiently handle large sets of related features that can be reduced down to one feature with a lookup. For example, you may have a multiplier (coefficient) associated with 10,000 different advertisers (so if the advertiser name for the ad unit is equal to one of the advertisers, then you apply the coefficient/multiplier associated with that advertiser). This could be accomplished without lookup features by using 10,000 different meta features (which is very inefficient). However, we can reduce this down to one feature by storing the 10,000 advertiser names in a lookup along with their associated multiplier. Instead of processing 10,000 features we are now doing an indexed lookup for one feature.<br>Lookup features should always have a coefficient of 1. | Lookup adv_+[advertiser name] |

While the feature type list above can be used to determine the list of variables and real-time lookup tables and functions that can be supported in this particular embodiment, we don't have to explicitly define features by type. In other words, we are not limited to creating features that fall into one of the types above; but, rather we can be limited by the variables, lookup tables and functions that can be supported. For example, while the feature "Advertiser average click-through rate is above 1%" doesn't fall into one of the categories above, we could still create a feature for this; because, the data warehouse (DW) variable, "advertiser average click-through rate" could be defined within our framework. Rather, features can be explicitly defined as one of the following:

Entirely real-time: Composed entirely of real-time variables

Composite: Composed of both real-time and off-line variables

Entirely offline: Compared entirely of offline variables

Models

An optimization model, in a particular embodiment, is a linear formula that applies coefficients to feature values to determine the predicted CTR for an ad unit. Model coefficients can be defined per-model (as opposed to per ad unit) and can be refreshed on a periodic basis by a refresh tool. A model can be defined as a series of coefficients for every feature in the inventory. For example:

MODEL 123

| Feature Name | Coefficient |
|---|---|
| f_image | 0.342 |
| f_kw1_l1 | 0.002 |
| f_kw1_l2 | 0 |
| ... | ... |
| f_add_url | 0.232 |

Note that a feature that shouldn't be factored into a model (like f_kw1_l2 above) can have a zero coefficient. In the example above, the pCTR using Model 123 for a particular ad unit would be calculated as:

$$pCTR=0.342 \times f\_image+0.002 \times f\_kw1\_{l}1+\ldots+0.232 \times f\_add\_url$$

In a particular embodiment, the framework 400 can be designed to support multiple models. The methodology to determine which model to utilize at real-time can be determined in the next phase.

DW Variable Calculation (can be Performed as an Offline Process)

Based on the refresh rate defined for each variable, a batch job can periodically run to calculate the value for the predefined list of DW variables for every active ad unit. This data can be stored within the normalized DW variable tables for consumption by the Feeder job (Ad Feeder).

IDF Token Value Calculation

A DW table can be created to store the Inverse Document Frequency (IDF) score for a large set of tokens. The IDF score for each token can be calculated as follows:

$$IDF\ Score = Total\#\ of\ creatives / \#\ of\ creatives\ that\ contain\ the\ token$$

The IDF lookup table can be loaded into the Ad Server 402 so that it can be accessed during real-time scoring. A batch job can periodically refresh the IDF values for tokens that have an IDF value that exceeds some pre-defined configurable limit. In addition, the batch job can locate and score new tokens as they appear in ads.

Offline Feature Calculation

The values for the "entirely offline" features can be calculated offline on a periodic basis. Before the data is loaded by the Ad Feeder into Ad Search, the values can be aggregated together using the model coefficient values for the applicable variables. For example, if a model contains two real-time variables, two composite variables and two offline variables and the model is set up as follows:

$$Ad\ Score=0.01*RT1+0.02*RT2+0.22*C1+0.32*C2+0.11*O1+0.21*O2$$

Then the offline score can be calculated as follows:

$$Offline\ score=0.11*O1+0.21*O2$$

Only the offline score (calculated at the ad unit-level) can be loaded into Ad Search. For the example above, during real-time ad serving the score for the ad would be calculated as follows:

$$Ad\ Score=0.01*RT1+0.02*RT2+0.22*C1+0.32*C2+[Offline\ Score]$$

Offline Quality Score Calculation

In a particular embodiment, a quality score can be calculated for a particular ad unit, as described above, and a quality score can be calculated for a particular advertiser (e.g., the source of the ad). The advertiser quality score can be based on a variety of factors including, advertiser revenue volume, seniority, business history, contractual arrangements, $3r^d$ party ratings, and the like. A quality score for each advertiser can be generated and stored in an offline process. The calculated offline quality score can be uploaded for each ad unit (e.g., unique creative, keyword, and match type combination) and each advertiser. Given that the quality of the advertiser and the quality of the ad unit itself can be good predictors of ad unit performance, the advertiser quality score and the ad unit quality score can be combined with the calculation of the predicted click thru rate (pCTR) to calculate the expected yield for a particular ad unit. In a particular embodiment, the yield can be calculated as follows:

$$Yield=(pCTR) \times (Advertiser\ Quality\ Score) \times (Ad\ Unit\ Quality\ Score) \times (Max\ CPC)$$

where pCTR is the predicted click thru rate and Max CPC is the maximum cost per click for the ad unit. In this manner, lower cost offline processes can be used to improve the performance, accuracy, and effectiveness of the real time ad serving processes. For example, the cost of serving of a particular ad in real time can be readily avoided if the offline calculated quality score for the advertiser and/or the offline calculated quality score for the ad itself does not meet or exceed a minimum quality score threshold. Thus, the highest quality advertisers and the highest quality ads can be served in real time thereby increasing overall yield of a particular ad service process.

Mia Modeling

An MIA modeling tool (SAS) can process the ad unit performance data and Ad Server logs offline and can periodically output new coefficient values for the optimization models.

Feeder

In a particular embodiment, the Ad Feeder can pull in all of the data required for Ad Scoring and the ad optimization model.

| Data | Description | Data Structure |
|---|---|---|
| Offline variable values | Calculated variable values for composite and real-time features. | Stored at appropriate level in data structure (account, campaign, ad group, creative or keyword) |
| Offline score | Calculated offline score at the ad-unit level. | Stored in lookup at the ad-unit level. |
| String lookup table | String/multiplier lookup values for Lookup Features. | Stored in string lookup table in the Ad Search. |
| Model coefficient values | Model-level coefficient values for composite and real-time features | Stored in model coefficient lookup table in Ad Search |

Ad Search

Figure 7:
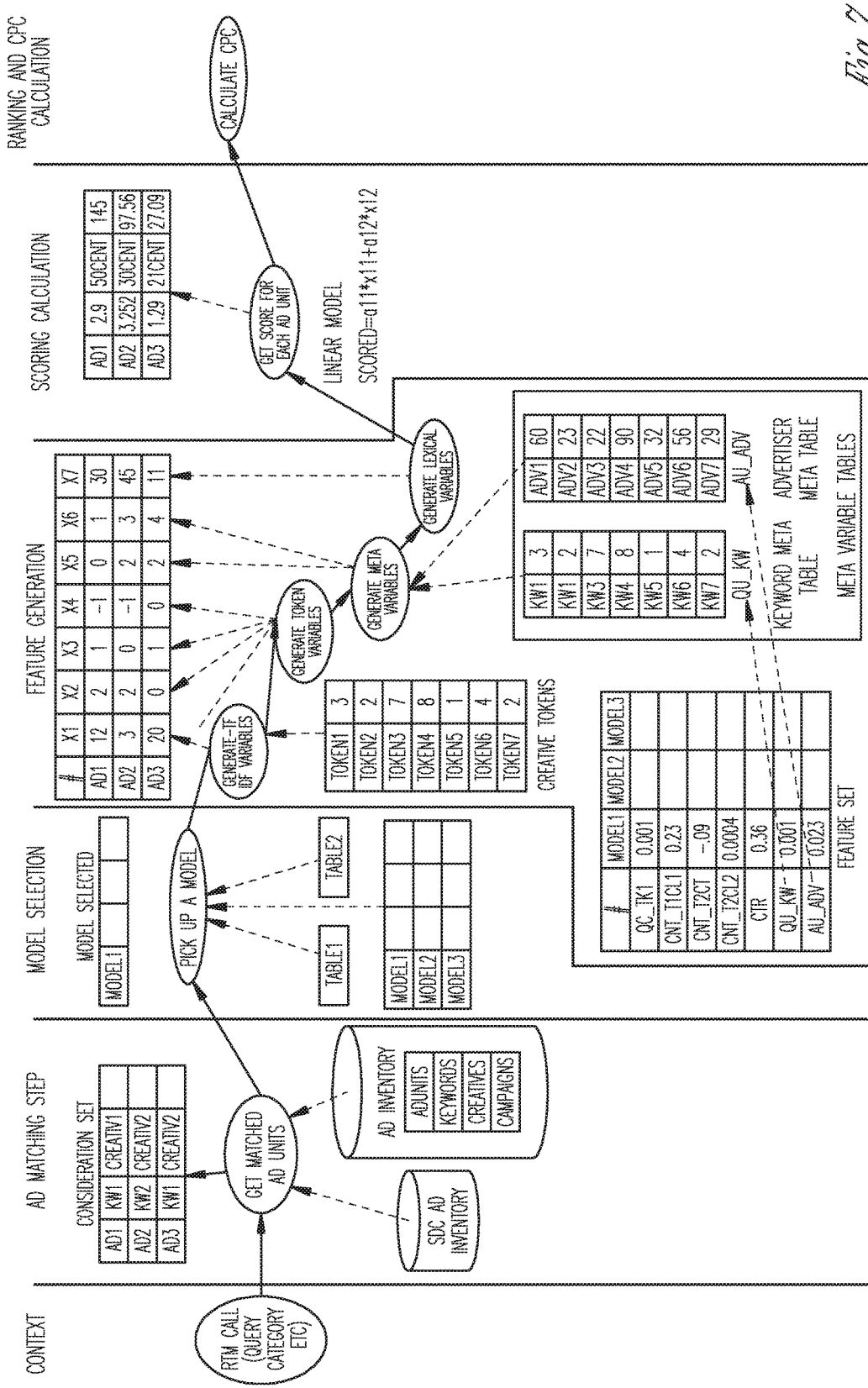
FIG. 7 illustrates a set of stages in an example process used in an embodiment to score and rank an ad.

During real-time, ad requests can be made to the Ad Server 402 and ads can be ranked and served according to the steps described herein. FIG. 7 illustrates a set of stages in an example process used in an embodiment to score and rank an ad.

Parameter Normalization

The Ad Server 402 can perform the following operations to determine what data to pass to Ad Search:

The Host Site ID can be used to determine the targeted Country

US-targeted ads should be served to various US sites

The user search query and category ID can be used to determine the keyword:

User search query can be normalized

The user query can be converted into lowercase.

The following disallowed special characters can be substituted with " " (whitespace)

! @ \ " # $ % ˆ * ( ) { } [ ] | \ \ = _ + ; < > , ? ~ ' \t ¡ ¢ £ ¤ ¥ ¦ § " © ª << ¬ ® ° ± $^{2\ 3\ '}$ µ ¶ · , $^{1\ °}$ » ¼ ½ ¾ ¿ × ÷ □

Duplicate, leading and tailing spaces can be removed (after special character whitespace substitution is applied)

If the search query is not null, the normalized query can be interpreted as the keyword If the search query is null, a hash can be applied to the combination of the category ID and country code to determine the keyword string If both the search string and category ID fields are null, no ads can be returned.

Ad Lookup

Ad Lookup can retrieve the ad units that satisfy the following:

For exact match Ad Units, the Ad Unit keyword string must exactly match the keyword passed in from RTM (after normalization).

For broad match Ad Units, the entire keyword string must appear as whole (with no breaks in between) in the search string passed by RTM.

For example, for the search string "cheap brand new blue ipod nano"

Keywords "blue ipod", "ipod nano", "new blue ipod", and "cheap brand new blue ipod" are all eligible.

Keywords "cheap ipod", "blue ipod nanos", "cheap brand new blue ipod nano plus" and "blue nano" are not eligible.

For all ads, the corresponding ad campaign should not have met or exceeded its daily allotted budget nor should the Account have exceeded its monthly allotted budget. This can be determined by making a real-time call to the budget server.

Ad must meet the advertiser type restrictions passed by the publisher.

Ad must be targeted to the country passed by the publisher.

Ad must be targeted to the language passed by the publisher

Model Selection

In a particular embodiment, one of a set of available scoring models can be used for Ad Scoring during this step.

Feature Calculation

For all of the eligible ad units, the Ad Optimizer 404 can determine which features need to be calculated by finding all features for the selected model that have a non-zero coefficient value. Next, the Ad Optimizer 404 can calculate the real-time and composite feature values for all of the eligible ad units as necessary. This process can involve the following operations:

Lookups on the various variable tables to pull the relevant variable values.

Lookups on the IDF token table to pull the IDF value for TF-IDF features.

Lookups to the string lookup table for Lookup features.

In-line functions (first token, second token, concatenate, mathematical functions, etc) applied to variable values.

A numeric value can be calculated for all applicable features for every eligible ad unit.

Scoring and Ranking

The feature values calculated above can be plugged into the appropriate linear model to calculate the pCTR (score) for each eligible ad unit. The coefficient for each feature for the selected model can be pulled from the model coefficient lookup table and the pCTR can be calculated for each ad unit as follows:

$$pCTR = c_1 F_1 + c_2 \times F_2 + c_3 \times F_3 + \ldots + c_n \times F_n$$

After determining the pCTR for each eligible ad unit, the ads can be ranked in descending (or ascending) order by yield. The yield for each ad unit can be calculated as follows:

$$Yield_n = pCTR_n \times MaxCPC_n$$

This preliminary ranking order can be captured for logging purposes.

Budget Check

For the top ranked ad units, a call can be made to the Budget Server to determine, (1) if the ad campaign corresponding to each ad unit has enough available budget and (2) if the account for each ad unit has enough available budget (both limits must be met). If there is not enough available budget for a particular ad unit, it can be removed from the ranking and cannot be served.

Advertiser Dedupe

In a particular embodiment, no more than one ad per advertiser should be served per RTM call. In order to meet this requirement, during this step a check can be made to verify that no more than one ad per advertiser is in the top n ranked ads, where n is the number of ads requested by the RTM times the page number of the search results (if available). If there are multiple ads for a particular advertiser, only the top ranked ad can be retained.

Actual CPC calculation

After the rules detailed above have been applied, the final ad ranking can be calculated. The Ad Server 402 can serve the ads ranked from n to m where:

n=(# of ads requested by RTM)×(page of search results−1)+1 m=(# of ads requested by RTM)×(page of search results)

Note: if the page of search results is not applicable, it should be assumed to be 1. For each of the ad units in the range above, the Actual CPC (the amount charged if the ad is clicked) can be calculated as follows:

Calculated Actual CPC=(Yield of the next ranked ad)/pCTR+0.01

If the Max CPC for the ad is lower than the Calculated Actual CPC, then the Max CPC value can be used instead.

If the floor value is higher than the Actual CPC as calculated by the two steps above, then the floor value can be used instead.

The floor value is a configurable value that defines the lowest amount than an advertiser should be charged for a click. This value should be defined per currency.

Logging

For each ad that is served, the following data should be captured in a log (per impression, per ad unit):

All non-zero calculated feature values (after coefficient is applied). The feature name should be captured along with the value.

The model that was used to calculated the ad unit's pCTR.

A flag to indicate if perturbation was applied.

Initial rank

Final rank

Max CPC

Actual CPC

Ad format

Search query (if not available in RTM logs)

Category (if not available in RTM logs)

Figure 8:
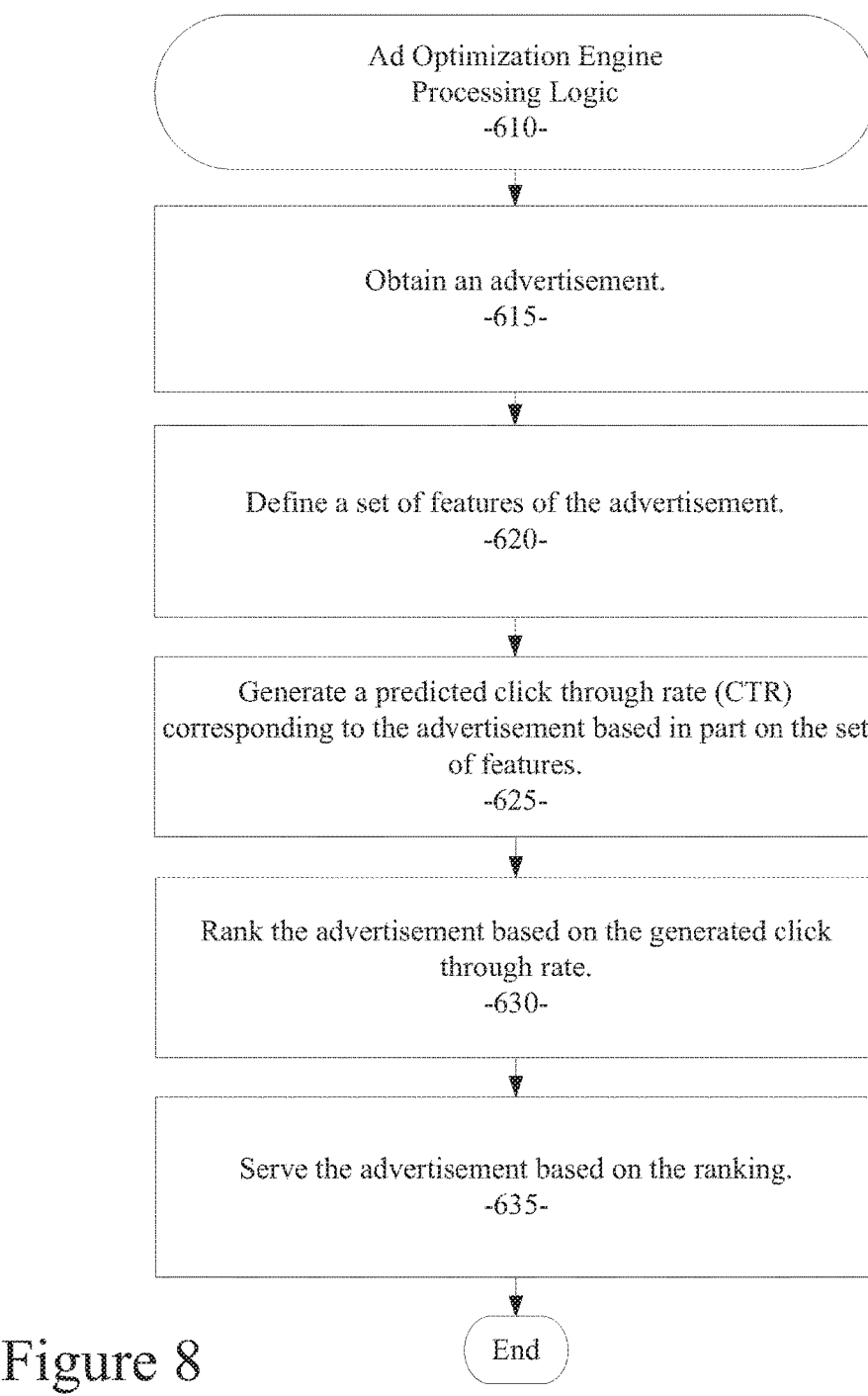
FIG. 8 is a processing flow chart illustrating an example embodiment of an advertising optimization engine as described herein.

FIG. 8 is a processing flow chart illustrating an example embodiment 610 of an advertising optimization engine as described herein. The method of an example embodiment includes: obtaining an advertisement (processing block 615); defining a set of features of the advertisement (processing block 620); generating a predicted click through rate (CTR) corresponding to the advertisement based in part on the set of features (processing block 625); ranking the advertisement based on the generated click through rate (processing block 630); and serving the advertisement based on the ranking (processing block 635).

Figure 9:
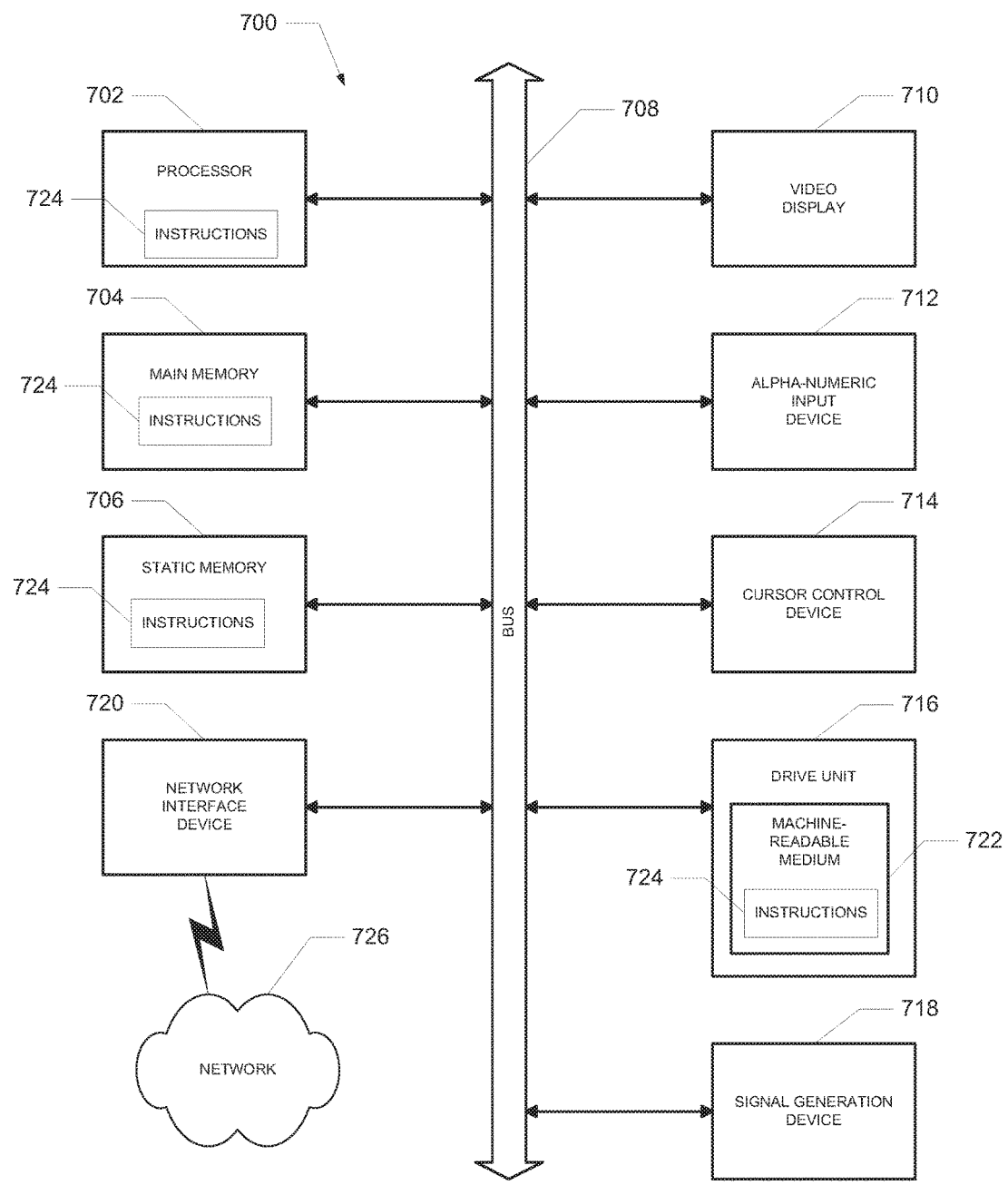
FIG. 9 shows a diagrammatic representation of machine in the example form of a computer system within which a set of instructions when executed may cause the machine to perform any one or more of the methodologies discussed herein.

FIG. 9 shows a diagrammatic representation of machine in the example form of a computer system 700 within which a set of instructions when executed may cause the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" can also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU), or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The instructions 724 may also reside, completely or at least partially, within the main memory 704, the static memory 706, and/or within the processor 702 during execution thereof by the computer system 700. The main memory 704 and the processor 702 also may constitute machine-readable media. The instructions 724 may further be transmitted or received over a network 726 via the network interface device 720. While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" can also be taken to include any medium that is capable of storing, encoding or carrying a set of instructions for execution by the machine and that cause the machine to perform any one or more of the methodologies of the various embodiments, or that is capable of storing, encoding or carrying data structures utilized by or associated with such a set of instructions. The term "machine-readable medium" can accordingly be taken to include, but not be limited to, solid-state memories, optical media, and magnetic media.

The Abstract of the Disclosure is provided to comply with 37 C.F.R. §1.72(b), requiring an abstract that can allow the reader to quickly ascertain the nature of the technical disclosure. It is submitted with the understanding that it can not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

We claim:

1. A method comprising:

receiving a request for a predetermined number of advertisements in response to a user submitting a search query on a host site, the host site hosting a plurality of listings of items for sale;

obtaining a set of candidate advertisements;

obtaining for each of the set of candidate advertisements a respective advertiser quality score pre-calculated in an automated non-realtime operation prior to user-submission of the search query, the respective advertiser quality scores being based at least in part on one or more factors from the group consisting of: advertiser revenue volume and advertiser seniority;

obtaining for each of the set of candidate advertisements a respective advertisement quality score pre-calculated in an automated non-realtime operation prior to user-submission of the search query;

in an automated operation performed using one or more computer processors configured to perform the operation, excluding from the set of candidate advertisements each advertisement that fails to satisfy a preliminary inclusion criterion, thereby obtaining a plurality of advertisements for further consideration, the preliminary inclusion criterion comprising at least one of:
the corresponding advertiser quality score equaling or exceeding a predefined advertiser quality score threshold, and
the corresponding advertisement quality score equaling or exceeding a predefined advertisement quality score threshold;
for each advertisement in the plurality of advertisements, identifying a set of features corresponding to items of the advertisement;
obtaining personalized consumer profile data including data indicative of a search and transaction history of a plurality of users;
for each advertisement in the plurality of advertisements, obtaining context data including associations between the personalized consumer profile data and the set of features corresponding to items of the advertisement;
for each advertisement in the plurality of advertisements, generating, by use of a processor, a predicted click through rate (CTR) corresponding to the advertisement based in part on the set of features corresponding to items of the advertisement, the personalized consumer profile data, and the context data;
thereafter automatically calculating, by use of at least one computer processor device configured therefor, a respective predicted yield for each of the plurality of advertisements, the calculating of the predicted yield for each of the plurality of advertisements comprising combining the corresponding click through rate, the corresponding advertiser quality score the corresponding advertisement quality score, and a corresponding cost per click payable by an associated advertiser;
ranking, by use of the processor, the plurality of advertisements based on their corresponding predicted yields;
selecting, by an advertising optimization engine implemented on an advertising optimization server, the predetermined number of advertisements based on the ranking; and
causing the selected advertisements to be displayed on the host site concurrently with search results for the search query, the search results comprising a portion of the plurality of listings of items for sale.

2. The method as claimed in claim 1 wherein defining a set of features includes defining a plurality of variables associated with each feature of the set of features.

3. The method as claimed in claim 1 wherein defining a set of features includes obtaining values for a plurality of variables associated with each feature of the set of features.

4. The method as claimed in claim I including determining a refresh interval corresponding to each of a plurality of variables associated with each feature of the set of features.

5. The method as claimed in claim 1 wherein the set of features includes at least one feature type from the group: tokenized features, term frequency-inverse document frequency (TF-IDF) features, meta features, lexical features, interaction features, and lookup features.

6. The method as claimed in claim 2 wherein the plurality of variables includes both real-time variables and offline variables.

7. The method as claimed in claim 2 including applying coefficients to each of the plurality of variables in an optimization model.

8. The method as claimed in claim 7 including using the optimization model to generate the predicted click through rate (CTR) corresponding to the advertisement.

9. The method as claimed in claim 7 including determining if an advertising campaign conforms to a pre-defined budget.

10. A system comprising:
a processor;
an advertising optimization module being executed by t e processor to:
receive a request for a predetermined number of advertisements in response to a user submitting a search query on a host site, the host site hosting a plurality of listings of items for sale;
obtain a set of candidate advertisements;
obtain for each of the set of candidate advertisements a respective advertiser quality score pre-calculated in an automated non-realtime operation prior to user-submission of the search query, the respective advertiser quality scores being based at least in part on one or more factors from the group consisting of: advertiser revenue volume and advertiser seniority;
obtain for each of the set of candidate advertisements a respective advertisement quality score pre-calculated in an automated non-realtime operation prior to user-submission of the search query;
exclude from the set of candidate advertisements each advertisement that fails to satisfy a preliminary inclusion criterion, thereby obtaining a plurality of advertisements for further consideration, the preliminary inclusion criterion comprising at least one of:
the corresponding advertiser quality score equaling or exceeding a predefined advertiser quality score threshold, and the corresponding advertisement quality score equaling or exceeding a predefined advertisement quality score threshold;
for each advertisement in the plurality of advertisements, identify a set of features corresponding to items of the advertisement;
obtain personalized consumer profile data including data indicative of a search and transaction history of a plurality of users;
for each advertisement in the plurality of advertisements, obtain context data including associations between the personalized consumer profile data and the set of features corresponding to items of the advertisement;
for each advertisement in the plurality of advertisements, generate a predicted click through rate (CTR) corresponding to the advertisement based at least in part on the set of features corresponding to items of the advertisement, the personalized consumer profile data, and the context data;
thereafter calculate a respective predicted yield for each of the plurality of advertisements, calculation of the predicted yield for each of the plurality of advertisements comprising combination of the corresponding click through rate, the corresponding advertiser quality score, the corresponding advertisement quality score, and a corresponding cost per click payable by an associated advertiser;
rank the plurality of advertisements based on their corresponding predicted yields; and select he predetermined number of advertisements based on the ranking; and an advertising server, coupled to the advertising optimization module, to cause the selected advertisements to be displayed on the host site concurrently with search results for the search query, the search results comprising a portion of the plurality of listings of items for sale.

11. The system as claimed in claim 10 being further configured to define a plurality of variables associated with each feature of the set of features.

12. The system as claimed in claim 10 being further configured to obtain values for a plurality of variables associated with each feature of the set of features.

13. The system as claimed in claim 10 being further configured to determine a refresh interval corresponding to each of a plurality of variables associated with each feature of the set of features.

14. The system as claimed in claim 10 wherein the set of features includes at least one feature type from the group: tokenized features, term frequency-inverse document frequency (TF-IDF) features, meta features, lexical features, interaction features, and lookup features.

15. The system as claimed in claim 11 wherein the plurality of variables includes both real-time variables and offline variables.

16. The system as claimed in claim 11 being further configured to apply coefficients to each of the plurality of variables in an optimization model.

17. The system as claimed in claim 16 being further configured to use the optimization model to generate the predicted click through rate (CTR) corresponding to the advertisement.

18. The system as claimed in claim 16 being further configured to determine if an advertising campaign conforms to a pre-defined budget.

19. A machine-useable storage medium embodying instructions which, when executed by a machine, cause the machine to:
receive a request for a predetermined number of advertisements in response to a user submitting a search query on a host site, the host site hosting a plurality of listings of items for sale;
obtain a set of candidate advertisements;
obtain for each of the set of candidate advertisements a respective advertiser quality score pre-calculated in an automated non-realtime operation prior to user-submission of the search query, the respective advertiser quality scores being based at least in part on one or more factors from the group consisting of: advertiser revenue volume and advertiser seniority;
obtain for each of the set of candidate advertisements a respective advertisement quality score pre-calculated in an automated non-realtime operation prior to user-submission of the search query;
exclude from the set of candidate advertisements each advertisement that fails to satisfy a preliminary inclusion criterion, thereby to obtain a plurality of advertisements for further consideration, the preliminary inclusion criterion comprising at least one of:
the corresponding advertiser quality score equaling or exceeding a predefined advertiser quality score threshold, and
the corresponding advertisement quality score equaling or exceeding a predefined advertisement quality score threshold;
for each advertisement in the plurality of advertisements, identify a set of features corresponding to items of the advertisement;
obtain personalized consumer profile data including data indicative of a search and transaction history of a plurality of users;
for each advertisement in the plurality of advertisements, obtain context data including associations between the personalized consumer profile data and the set of features corresponding to items of the advertisement;
for each advertisement in the plurality of advertisements, generate a predicted click through rate (CTR) corresponding to the advertisement based at least in part on the set of features corresponding to items of the advertisement, the personalized consumer profile data, and the context data;
thereafter calculate a respective predicted yield for each of the plurality of advertisements, calculation of the predicted yield for each of the plurality of advertisements comprising combination of the corresponding click through rate, the corresponding advertiser quality score, the corresponding advertisement quality score, and a corresponding cost per click payable by an associated advertiser;
rank the plurality of advertisements based on their corresponding predicted yields; and
select the predetermined number of advertisements based on the ranking; and
cause the selected advertisements to be displayed on the host site concurrently with search results for the search query, the search results comprising a portion of the plurality of listings of items for sale.

20. The machine-useable storage medium as claimed in claim 19 being further configured to define a plurality of variables associated with each feature of the set of features.

21. The machine-useable storage medium as claimed in claim 19 being further configured to obtain values for a plurality of variables associated with each feature of the set of features.

22. The machine-useable storage medium as claimed in claim 19 being further configured to determine a refresh interval corresponding to each of a plurality of variables associated with each feature of the set of features.

23. The machine-useable storage medium as claimed in claim 19 wherein the set of features includes at least one feature type from the group: tokenized features, term frequency inverse document frequency (TF-IDF) features, meta features, lexical features, interaction features, and lookup features.

* * * * *

UNITED STATES PATENT AND TRADEMARK OFFICE
CERTIFICATE OF CORRECTION

PATENT NO. : 9,547,865 B2
APPLICATION NO. : 12/645018
DATED : January 17, 2017
INVENTOR(S) : Torigoe et al.

Page 1 of 1

It is certified that error appears in the above-identified patent and that said Letters Patent is hereby corrected as shown below:

On the Title Page

In item (65), in "Prior Publication Data", in Column 1, Line 1, after "2010", insert --¶Related U.S. Application Data
(62) Provisional application No. 61/164,849, filed on Mar. 30, 2009.--

In the Claims

In Column 19, Line 37, in Claim 1, delete "score" and insert --score,-- therefor In Column 19, Line 57, in Claim 4, delete "claim I" and insert --claim 1-- therefor In Column 20, Line 12, in Claim 10, delete "t e" and insert --the-- therefor In Column 20, Line 38, in Claim 10, after "and", insert --¶--

In Column 21, Line 1, in Claim 10, delete "he" and insert --the-- therefor

Signed and Sealed this
Eighteenth Day of September, 2018

Andrei Iancu
*Director of the United States Patent and Trademark Office*